May 5, 1959  R. A. TEWKSBURY ET AL  2,885,639
DUAL-RANGE METERS

Filed May 28, 1956  2 Sheets-Sheet 1

INVENTORS.
Robert A. Tewksbury &
Leon C. Wolferd
By: Louis Robertson Atty.

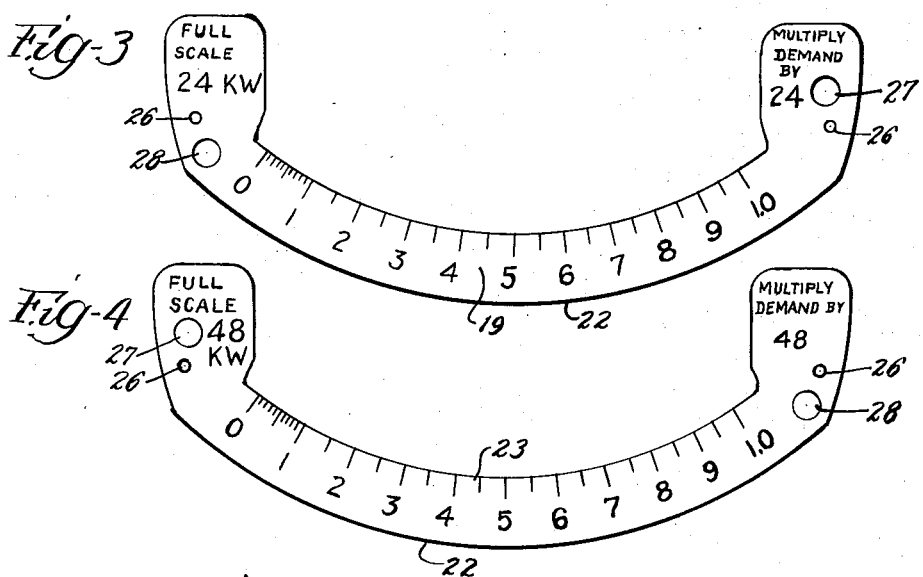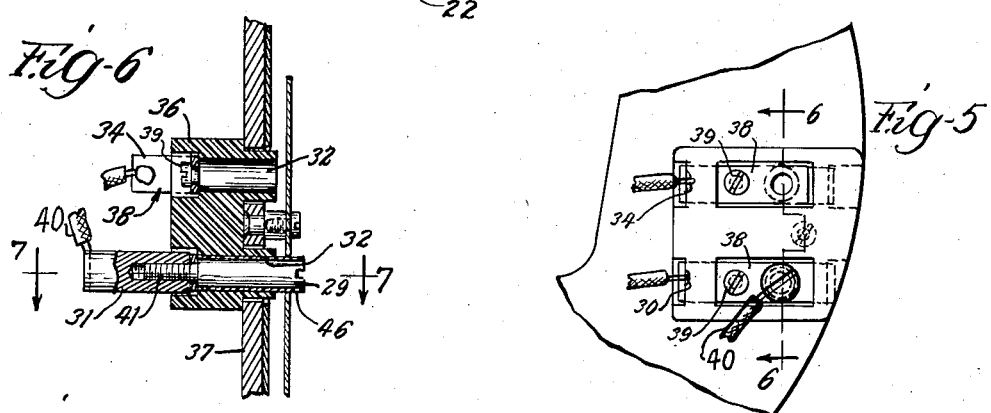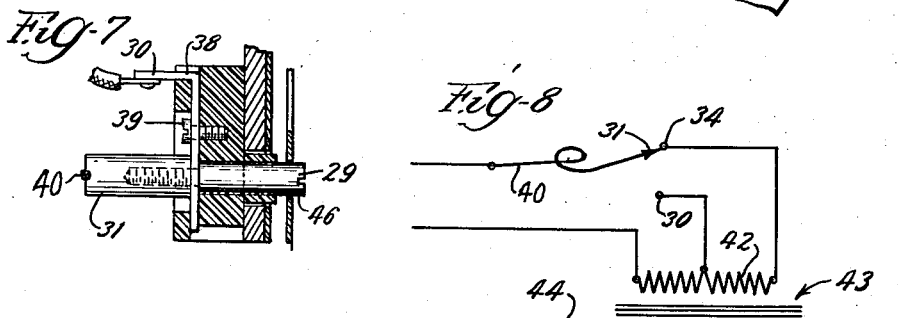

United States Patent Office 2,885,639
Patented May 5, 1959

2,885,639

DUAL-RANGE METERS

Robert A. Tewksbury, Wabash Township, Tippecanoe County, and Leon C. Wolferd, Lafayette, Ind., assignors, by mesne assignments, to Duncan Electric Company, Inc., Lafayette, Ind., a corporation of Indiana Application May 28, 1956, Serial No. 587,703

5 Claims. (Cl. 324—115)

There are many electric meters of various kinds in which the connections can be changed to select different ranges for the meter indications. The present invention is especially concerned with maximum demand meters of this character.

One type of billing for electric power or energy takes into consideration not only the number of kilowatt hours used during the billing period but also the maximum demand during the billing period. The maximum demand meter usually includes a scale and a maximum demand pointer which, by one means or another, is pushed along this scale to indicate the maximum demand in watts, volt-amperes, or amperes during the billing period. Accuracy of reading depends to some extent on choosing a range of measurement suitable for the particular installation. For example, if an installation is expected to occasionally measure a maximum demand running as high as 48 kilowatts, the meter range must be chosen such that a 48-kilowatt demand will not move the pointer off the scale. If the same meter is used with the same 48-kilowatt range when no demand over 24 kilowatts is to be encountered, the upper half of this scale and the upper half of the range of potential movement of the pointer is wasted. Now if the same meter is adjusted to select a 24-kilowatt range, the entire scale will again be used and more accurate reading will be possible.

One objection to the idea of dual-range meters, especially for maximum demand indicating purposes, has been the danger that errors would result. For example, if the connections were made for a 24-kilowatt range and if the meter reader mistakenly believes it was connected for a 48-kilowatt range, the customer would be billed for twice as much demand as the meter had really measured. And with the opposite situation, the customer would be billed for only half the demand that the meter actually measured.

According to the present invention, interlock features are provided between the range-selecting member and a reversible scale, so that no matter which range is chosen, the scale, when applied, will inevitably indicate that range. Furthermore, this is accomplished in an exceedingly simple and inexpensive manner.

Additional objects and advantages of the invention will be apparent from the following description and from the drawings.

Designation of figures

Figs. 3 and 4 are opposite faces of the same scale-plate forming part of this invention.

Fig. 5 is a fragmentary rear view of the demand meter front mounting plate, showing especially the rear view of that part of the connecting device mounted on the mounting plate.

Fig. 6 is a fragmentary sectional view taken approximately on the line 6—6 of Fig. 5, showing the connections made for the lower of the two ranges for which the indicator of Figs. 3 and 4 is designed.

Fig. 7 is a fragmentary sectional view taken approximately on the line 7—7 of Fig. 6.

Fig. 8 is a circuit diagram showing the connections made by the illustrated structure.

General description

Figure 1:
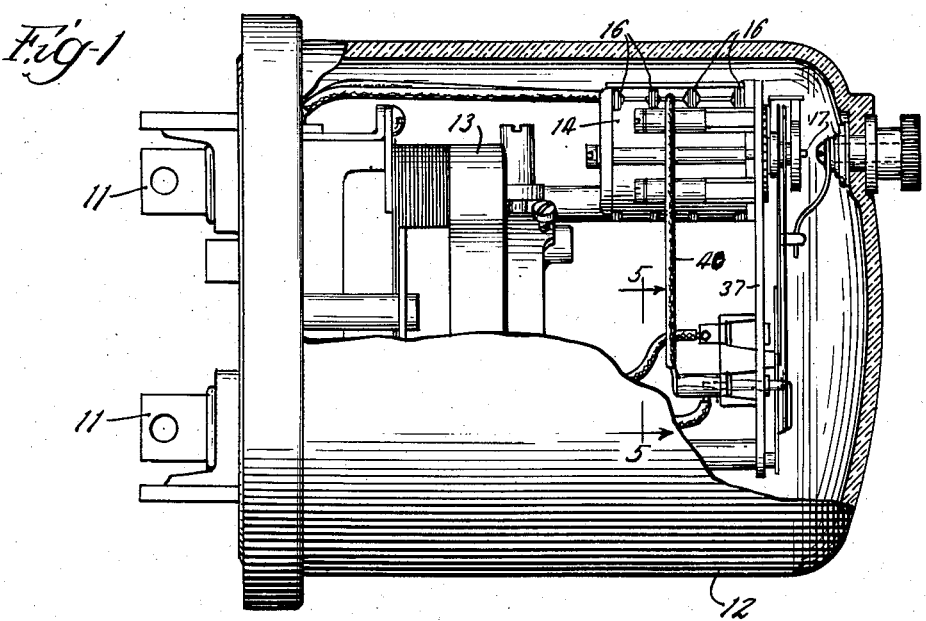
Fig. 1 is a side view of a combination thermal watt demand meter chosen for illustration of the present invention, with some parts broken away for clarity and with some parts of the associated watthour mechanism omitted for clarity.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The meter chosen for illustration is of the so-called socket type, having a plurality of terminal blades 11 at its rear, which can be thrust into a meter socket for completing the connections to the meter. Within the glass housing 12, there may be a watthour meter, only a portion 13 of which is illustrated. The present invention is more directly concerned with the maximum demand meter. In the illustrated form, the maximum demand metering element comprises a housing 14 with a plurality of U-shaped heaters 16 therein, only the terminals of which are shown. A shaft 17 extends horizontally through the housing 14 and is controlled by bimetallic coils, not shown. The shaft 17 has fixed thereon an indicator sweep-hand 18 which moves back and forth along a scale 19 under the influence of the bimetallic coils and one or more adjusting springs and the like, which need not be described. The indicator 18 is commonly called a pusher hand, because if it swings to a higher position on the scale than a previous position of the maximum demand pointer 21, it will push the maximum demand pointer 21 along with it. As the demand falls off, the indicator 18 will drop back, swinging away from the maximum demand pointer 21.

According to the present invention, the scale 19 is on a scale plate 22, which has a scale 23 on the opposite face thereof. It happens that these two scales, considered alone, are very similar, and in some instances might be quite identical. But considered with the other indications on the same face, the readings of scale 19 are only half as high a scale as those of the scale 23. Thus, in the upper right corner of Fig. 3, the wording indicates that the reading of that scale should be multiplied by 24, whereas in the corresponding position of Fig. 4, the wording indicates that the reading of that scale should be multiplied by 48.

The scale plate 22 may be applied to the meter with either face exposed. In the illustrated form of the invention, the scale plate is inverted by turning about a vertical inversion axis; that is, it is turned from right to left. In either event, it is secured by a pair of screws 24 which pass through holes 26. The holes 26 are symmetrically arranged with respect to the scale, so that the scale assumes the same position, no matter which face of the scale plate is exposed. However, the scale plate 22 also has a pair of larger holes 27 and 28 therein. One of these is above the adjacent screw-hole 26 and the other is below the screw-hole 26 adjacent to it.

Figure 2:
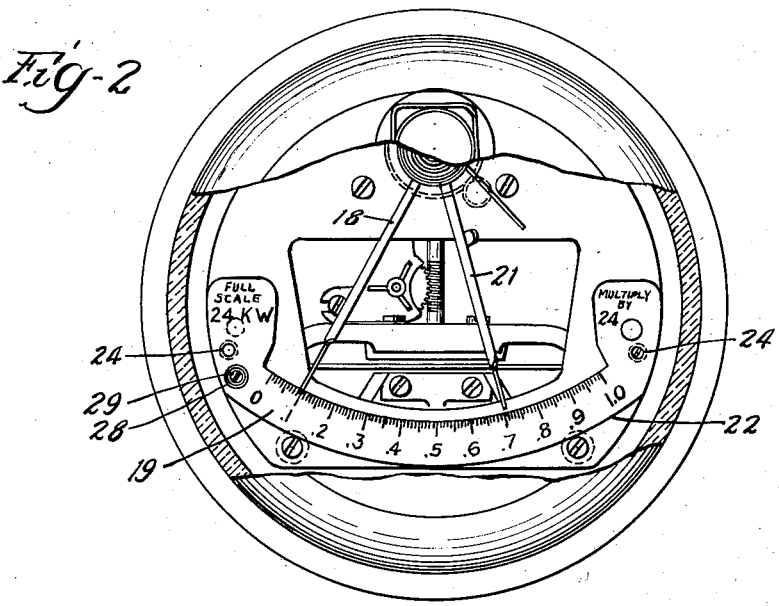
Fig. 2 is a face view of the structure shown in Fig. 1, again with some parts broken away or omitted for clarity.

When the scale plate 22 is mounted with its low-range face exposed, as in Fig. 2, the hole 28 is at the left, as in Figs. 2 and 3. When the hole 28 is at the left, a range-selecting screw 29 may extend through it, as seen best in Figs. 6 and 7. When in this position, the range-selecting screw 29 connects a movable terminal 31 with the lower terminal 30 forming one end of the lower of two connecting members 38 to complete the low-range connection.

If the plate 22 is reversed without moving the range-selector screw 29, the plate 22 cannot be secured in its place on the meter, because it will strike the head of screw 29. However, if the range-selecting screw 29 is moved to the upper position 32 shown in Fig. 6, the scale with the high range exposed would slip over it, because the higher hole 27 would be aligned with the screw 29 in this upper position. In this upper position, the screw 29 would again screw into the terminal 31, which would also have been moved to its upper position, so that it would connect the terminal 31 to the upper terminal 34.

*Range-selector details*

The range-selector body 36 is of insulating material, and is secured to the back of the meter face plate 37. It is slotted at two places, each to receive an L-shaped connection member 38, as seen in Fig. 7. Each connection member may be secured in place by a screw 39. Each of the connecting members 38 is provided with an aperture in alignment with one of the passages 32. Thus the range-selecting screw 29 can be slipped into either of the passages 32 and its threaded reduced end 41 may be passed through the aperture in the associated connector 38. The terminal 31 may be held in alignment with the screw 29 while the screw is turned and the screw will then be screwed into the terminal 31, which thus acts as a nut. The range-selector screw 29 therefore screws the terminal 31 firmly against the rear side of one or the other of the connectors 38.

The terminal 31 is connected by a wire 40 to a pair of the heaters 16, as seen best in Fig. 1. The terminal 34 is connected to the end tap of the secondtry coil 42 of a current transformer 43, as diagrammatically represented in Fig. 8. The terminal 30 is connected to the center tap of the same secondary coil 42. Thus, twice as much current must flow through the conductor 44 to produce a given current in the secondary circuit if the terminal 31 is connected to the terminal 34 than if it is connected to the terminal 30. The current transformer 43 may be of any suitable type and is preferably mounted within the outer meter housing 12. No attempt has been made to illustrate it, however. The conductor 44 thereof may be connected between two of the terminal blades 11, and if a watthour meter is provided within the same housing 12, the conductor 44 will be a part of the current coil circuit of the watthour meter.

It will be evident to those skilled in the art that the range-selecting device of Figs. 5 to 7 is exceedingly simple, economical and dependable. Its cooperation with the scale plate 22 of Figs. 3 and 4 positively prevents mounting the scale plate with the wrong face exposed for the setting of the range selector.

The same principles can be used with other meters requiring one or more changes of connection to change the meter's range. Also, control elements other than a screw can be used. For example, a plug insertable in either of two bridging positions has some advantages. It can be shifted without moving wires. Also, it can easily have two sections for independently bridging two pairs of contacts in one position and a different two pairs of contacts in another position. Meters of the general type illustrated, but for polyphase or three-wire circuits, may have more than one current transformer according to conventional practice and some would require more than one range-selecting shifting connection.

We claim:

1. The combination of a meter unit having a moving indicator and alternative connections for different ranges, an electrical connecting device in which a screw is inserted at alternative points for making and screw-tightening said connections alternatively, and an indicator scale plate adapted to lie along the path of the meter indicator, said scale plate bearing markings on the opposite faces of the scale plate respectively appropriate for the alternative connections, being secured by means confining it to a single position with either face exposed, and having portions positioned to strike the screw to prevent mounting except with the face exposed bearing markings appropriate for the position the screw is in, but shaped to receive the screw and permit mounting if the exposed face is appropriate for the position the screw is in.

2. The combination of a maximum demand meter unit having current transformer means with alternative taps for different ranges, a meter element energized by said means and having a maximum demand pointer, a connecting device in which a screw is inserted at alternative points for making screw-tightened connection between said element and taps alternatively, and an indicator scale plate adapted to lie along the path of the pointer, said scale plate bearing markings on the opposite faces of the scale plate respectively appropriate for the alternative connections, being secured by means confining it to a single scale position with either face exposed, and having portions positioned to strike the screw to prevent mounting except with the face exposed bearing markings appropriate for the position the screw is in, but shaped to receive the screw and permit mounting if the exposed face is appropriate for the position the screw is in.

3. The combination of a meter unit having a moving indicator and alternative circuit portions connectable by alternative connections for different measurement ranges, and an indicator scale plate adapted to lie along the path of the meter indicator, said scale plate bearing markings on the opposite faces of the scale plate respectively appropriate for said ranges, and being secured by means confining it to a single position with either face exposed, and electrical connecting means in which a range selecting member is movable, when the scale plate is removed, between alternative points for making said connections alternatively, said member being adapted to clamp connecting parts together firmly while the scale plate is removed; said scale plate having portions for striking the range-control member to prevent mounting of the scale plate except with the face exposed bearing markings appropriate for the range corresponding to the position the range control member is in, and portions shaped to receive the range control member to permit mounting if the exposed face is appropriate for the range corresponding to the position the range control member is in.

4. The combination of a maximum demand meter unit having current transformer means with alternative taps connectable by alternative connections for different ranges, a meter element energized by said means and having a maximum demand pointer, and an indicator scale plate adapted to lie along the path of the meter indicator, said scale plate bearing markings on the opposite faces of the scale plate respectively appropriate for said ranges, and being secured by means confining it to a single position with either face exposed, and electrical connecting means in which a range selecting member is movable, when the scale plate is removed, between alternative points for making said connections alternatively, said member being adapted to clamp connecting parts together firmly while the scale plate is removed; said scale plate having portions for striking the range-control member to prevent mounting of the scale plate except with the face exposed bearing markings appropriate for the range corresponding to the position the range control member is in, and portions shaped to receive the range control member to permit mounting if the exposed face is appropriate for the range corresponding to the position the range control member is in.

5. The combination of a maximum demand meter unit having current transformer means with alternative taps for different ranges, a meter element energized by said means and having a maximum demand pointer, a connecting device in which a screw is inserted at alternative positions for making screw-tightened connection between said element and taps alternatively, and an indicator scale plate adapted to lie along the path of the pointer, said scale plate bearing markings on the opposite faces of the scale plate respectively appropriate for the alternative connections when the scale plate has been inverted about an inversion axis and being secured by means confining it to a single scale position with either face exposed, the scale plate having a screw receiving portion on each side of the inversion axis positioned and shaped to receive the screw, each with the screw in a different one of its positions, to permit mounting the scale plate, and having a screw-striking portion on each side of the inversion axis positioned to strike the screw and prevent mounting the scale plate if the screw is in the position the screw-receiving portion on the other side of the inversion axis would receive.

References Cited in the file of this patent

UNITED STATES PATENTS

| | | |
|---|---|---|
| 2,103,606 | Abrahamsohn | Dec. 28, 1937 |
| 2,384,350 | Skulley | Sept. 4, 1945 |
| 2,665,185 | Paine | Jan. 5, 1954 |